(12) United States Patent
Maruca et al.

(10) Patent No.: US 7,870,042 B2
(45) Date of Patent: Jan. 11, 2011

(54) SYSTEMS AND METHODS FOR IDENTIFYING BANNED WASTE IN A MUNICIPAL SOLID WASTE ENVIRONMENT

(75) Inventors: Dominic Maruca, Holliston, MA (US); Jerry Leone, Victor, NY (US); Nancy Edwards Cronin, Jericho, VT (US)

(73) Assignee: Casella Waste Systems, Inc., Rutland, VT (US)

( * ) Notice: Subject to any disclaimer, the term of this patent is extended or adjusted under 35 U.S.C. 154(b) by 431 days.

(21) Appl. No.: 11/433,505

(22) Filed: May 15, 2006

(65) Prior Publication Data
US 2007/0262878 A1 Nov. 15, 2007

(51) Int. Cl.
*G06F 17/60* (2006.01)
(52) U.S. Cl. .............. 705/28; 340/572.1; 340/686.1; 235/375; 209/509
(58) Field of Classification Search .............. 705/28; 340/572.1, 686.1; 235/375
See application file for complete search history.

(56) References Cited

U.S. PATENT DOCUMENTS

| | | | |
|---|---|---|---|
| 4,688,026 A | | 8/1987 | Scribner et al. |
| 5,014,206 A | * | 5/1991 | Scribner et al. ............. 701/207 |
| 5,121,853 A | | 6/1992 | Edelhoff et al. |
| 5,326,939 A | | 7/1994 | Schafer et al. |
| 5,340,968 A | | 8/1994 | Watanabe et al. |
| 5,392,926 A | | 2/1995 | Schafer et al. |
| 5,416,706 A | | 5/1995 | Hagenbuch |
| 5,565,846 A | * | 10/1996 | Geiszler et al. .......... 340/572.2 |
| 5,837,945 A | | 11/1998 | Cornwell et al. |
| 5,947,256 A | | 9/1999 | Patterson |
| 6,191,691 B1 | | 2/2001 | Serrault et al. |
| 6,206,282 B1 | | 3/2001 | Hayes, Sr. et al. |
| 6,211,781 B1 | | 4/2001 | McDonald |
| 6,448,898 B1 | | 9/2002 | Kasik |
| 6,496,806 B1 | | 12/2002 | Horwitz et al. |
| 6,505,106 B1 | | 1/2003 | Lawrence et al. |
| 6,520,544 B1 | | 2/2003 | Mitchell et al. |
| 6,600,418 B2 | | 7/2003 | Francis et al. |
| 6,601,764 B1 | | 8/2003 | Goodwin, III |

(Continued)

FOREIGN PATENT DOCUMENTS

EP 0905057 A1 3/1999

(Continued)

OTHER PUBLICATIONS

PCT/US07/005666 International Search Report mailed Dec. 19, 2007 (2 pages).

(Continued)

*Primary Examiner*—Vanel Frenel
(74) *Attorney, Agent, or Firm*—Wilmer Cutler Pickering; Hale and Dorr LLP

(57) ABSTRACT

System and methods for identifying waste items in a waste management environment includes reading data from a plurality of identifiers that are attached to waste items. The read data is compared with reference data stored in one or more data repositories. If a match exists between any of the read data and the reference data, an indication of non-compliance of the waste item with predetermined safety criteria is provided.

19 Claims, 7 Drawing Sheets

U.S. PATENT DOCUMENTS

| | | |
|---|---|---|
| 6,687,683 B1 | 2/2004 | Harada et al. |
| 6,690,402 B1 | 2/2004 | Waller et al. |
| 6,694,248 B2 | 2/2004 | Smith et al. |
| 6,759,959 B2 | 7/2004 | Wildman |
| 6,847,892 B2 | 1/2005 | Zhou et al. |
| 6,867,683 B2 | 3/2005 | Calvesio |
| 7,117,160 B1 | 10/2006 | Haynes et al. |
| 7,278,571 B2 | 10/2007 | Schmidtberg et al. |
| 7,287,694 B2 | 10/2007 | Banavar et al. |
| 7,313,602 B2 | 12/2007 | Ono et al. |
| 7,416,134 B2 | 8/2008 | McDonald et al. |
| 2002/0105424 A1 | 8/2002 | Alicot et al. |
| 2002/0154915 A1 | 10/2002 | Bullock et al. |
| 2002/0170685 A1 | 11/2002 | Weik et al. |
| 2002/0196150 A1 | 12/2002 | Wildman |
| 2003/0067381 A1 | 4/2003 | Mitchell et al. |
| 2003/0112155 A1 | 6/2003 | Landre et al. |
| 2003/0132853 A1 | 7/2003 | Ebert |
| 2003/0158795 A1 | 8/2003 | Markham et al. |
| 2003/0227392 A1 | 12/2003 | Ebert et al. |
| 2004/0004119 A1 | 1/2004 | Baldassari et al. |
| 2004/0012481 A1 | 1/2004 | Brusseaux |
| 2004/0021579 A1 | 2/2004 | Oursler et al. |
| 2004/0027243 A1 | 2/2004 | Carrender |
| 2004/0046672 A1 | 3/2004 | Kasik et al. |
| 2004/0129781 A1 | 7/2004 | Kreiner et al. |
| 2004/0133484 A1 | 7/2004 | Kreiner et al. |
| 2004/0153379 A1 | 8/2004 | Joyce et al. |
| 2004/0178264 A1 | 9/2004 | Linton et al. |
| 2004/0199785 A1 | 10/2004 | Pederson |
| 2005/0004702 A1 | 1/2005 | McDonald |
| 2005/0055582 A1 | 3/2005 | Bazakos et al. |
| 2005/0285743 A1 | 12/2005 | Weber |
| 2007/0260466 A1 | 11/2007 | Casella et al. |
| 2008/0191009 A1 | 8/2008 | Gressel et al. |

FOREIGN PATENT DOCUMENTS

| | | |
|---|---|---|
| EP | 0760985 B1 | 3/2000 |
| EP | 07060985 B1 | 3/2000 |
| EP | 1477430 A1 | 11/2004 |

OTHER PUBLICATIONS

Fanelli, T. "Coastal Computer Corporation's ESC Software Extend Best Software's Peachtree Capabilities," WorldWire, Mar. 10, 2004 (2 pages).

WayBackMachine, SpiderWeave.com Terms of Service, Available at http://webarchive.org/web*//http://spiderweave.com/policies/terms-of-services.html. Accessed Sep. 15, 2008 (4 pages).

SwiftCD.com, "SwiftCD Late Payment Policy," Available at http://web.archive.org/web/20050310094935/http://www.swiftcd.com/faq.late.html. Accessed Mar. 21, 2009 (2 pages).

Murphy, P. "Tennessee Regulatory Authority Memorandum," Jul. 20, 2006 (3 pages).

Electronic Services Control website "Whats New," Available at http://web.archive.org/web/20040404035817/coastalcomputercorporation.com/html/overview. Accessed Sep. 14, 2008 (17 pages).

* cited by examiner

| Unique Identifier | Domain Manager Identifier | Object Class Identifier | Item Type | Material | Weight (grams) |
|---|---|---|---|---|---|
| 00101 | Company A | 1 | 16 oz bottle | glass | 100 |
| 00105 | Company A | 2 | 12 oz can | aluminum | 5 |
| 00108 | Company B | 1 | 12 oz can | aluminum | 5 |
| 00309 | Company B | 2 | 750 ml bottle | glass | 140 |
| 00345 | Company B | 3 | 1/2 gallon container | plastic | 25 |
| | . . . | . . . | | | |

FIG. 5

SYSTEMS AND METHODS FOR IDENTIFYING BANNED WASTE IN A MUNICIPAL SOLID WASTE ENVIRONMENT

BACKGROUND OF THE INVENTION

1. Field of the Invention

Embodiments of the present invention relate to the field of waste management and, more particularly, to identifying banned waste in a municipal solid waste environment.

2. Background of the Invention

Waste management companies provide residential, commercial, and municipal waste management and recycling services for communities and organizations. Customers can range, for example, from single residences to entire towns or companies. Municipalities may contract with a waste management service provider to handle their municipal solid waste (MSW). MSW includes garbage, refuse, and other discarded material that result from residential, commercial, industrial, and community activities.

Commonly, in conjunction with the collection of refuse, a waste management service places waste containers for use at a plurality of customer sites. Waste container types that are utilized by customers are diverse in the industry and include, for example, residential or commercial large-volume metal containers such as dumpsters, roll-off containers, and rolling lift (or tip) carts.

Often, residential or commercial customers put waste other than MSW into a waste container. Such waste can generally be termed "banned waste" that must be disposed of properly in order to comply with local, state and/or federal laws and regulations.

One type of banned waste is referred to as hazardous waste. As used herein, hazardous waste is a waste with properties that make it dangerous or potentially harmful to human health or the environment. The universe of hazardous wastes is large and diverse. Hazardous wastes can be liquids, solids, contained gases, or sludges. They can be the by-products of manufacturing processes or simply discarded commercial products, like cleaning fluids or pesticides.

In regulatory terms, a Resource Conservation and Recovery Act (RCRA) hazardous waste is a waste that appears on one of the four hazardous wastes lists (F-list, K-list, P-list, or U-list), or exhibits at least one of four characteristics—ignitability, corrosivity, reactivity, or toxicity. Hazardous waste is regulated under the RCRA Subtitle C.

Another type of banned waste referred to as "special waste" can include items such as household hazardous waste, bulky wastes (refrigerators, pieces of furniture, etc.) tires, and used oil. State and local governments regulate both hazardous and special waste to ensure proper transport and disposal. Generally, only properly permitted and regulated companies are authorized to remove and dispose of these types of waste.

Both hazardous and special wastes are also regulated by local and state governments to ensure, for example, that proper transport and disposal procedures are followed. Often, customers co-mingle banned waste with standard MSW. Generally, only properly permitted and regulated companies are authorized to remove and dispose of these types of waste. If a waste carrier picks up these banned waste items, either knowingly or unwittingly, the waste carrier may be violating one or more operating permits and is subject to various penalties, such as monetary fines and/or suspension of one or more permits.

Currently, the process for identifying banned waste is manual and, therefore, prone to error. If collection vehicle personnel do not visually detect banned waste at the customer site, it can be inadvertently loaded onto the collection vehicle. The banned waste is then later identified and removed at a transfer station or landfill. As a consequence, the waste company assumes the risk and is responsible for the proper disposal and associated costs for the banned waste. The waste company may not be able to pass these costs to the originating customer, because it is often impossible to identify the customer from which the banned waste was collected. However, banned waste sometimes also goes undetected throughout the entire collection, transport, and disposal process. This creates personnel safety implications, and the likelihood that the waste will end up in a landfill, which may eventually cause damage to the environment.

Therefore, we have determined that there exists a need to automatically identify banned waste during the MSW collection process. This would advantageously prevent banned waste from entering the MSW stream, and eliminate problems associated with subsequent disposal of this type of material.

BRIEF DESCRIPTION OF THE DRAWINGS

FIG. 5 is an exemplary data table in accordance with an embodiment of the present invention.

SUMMARY OF EMBODIMENTS OF THE INVENTION

Embodiments of the present invention describe systems and methods for identifying banned waste items in a waste management environment. In one embodiment of the invention, data is read from a plurality of identifiers, each of which is affixed to an item of waste. The read data is compared to reference data stored within a data repository and, if a match is found, the system provides an alert. The alert indicates that the waste item matches reference data, and is thus a banned waste item. The alert provides an indication that allows personnel to remove and/or treat the banned waste item in accordance with approved regulations and/or procedures. The identifiers can be implemented using radio frequency identification tags (RFID).

A customer can be notified that banned waste has been detected at the customer's site. Notification can be done using a data repository of customer information. One method of finding a particular customer's contact information is by using the global position system to determine the location of the banned waste item. The data repository of customer information can be searched for the customer associated with that location.

In another embodiment of the present invention, a plurality of identifiers, each of which is affixed to a respective waste item, is read by an identification reader associated with a vehicle having an onboard computer. The onboard computer and identification reader can be used to read the data stored on the identifier, and compare the read data to reference data. The system can further include a device for providing an indication that a banned waste item has been detected.

Although embodiments of the present invention have been described for use in connection with detecting banned waste items. Embodiments of the present invention can be used to detect any type of waste item, and to provide an alert when it is detected. For example, embodiments of the present invention can be used to detect waste that needs to be recycled to comply with government regulations. After the recyclable waste is detected it can be handled so that it does not become intermingled with regular waste.

DETAILED DESCRIPTION OF EMBODIMENTS OF THE INVENTION

Figure 1:
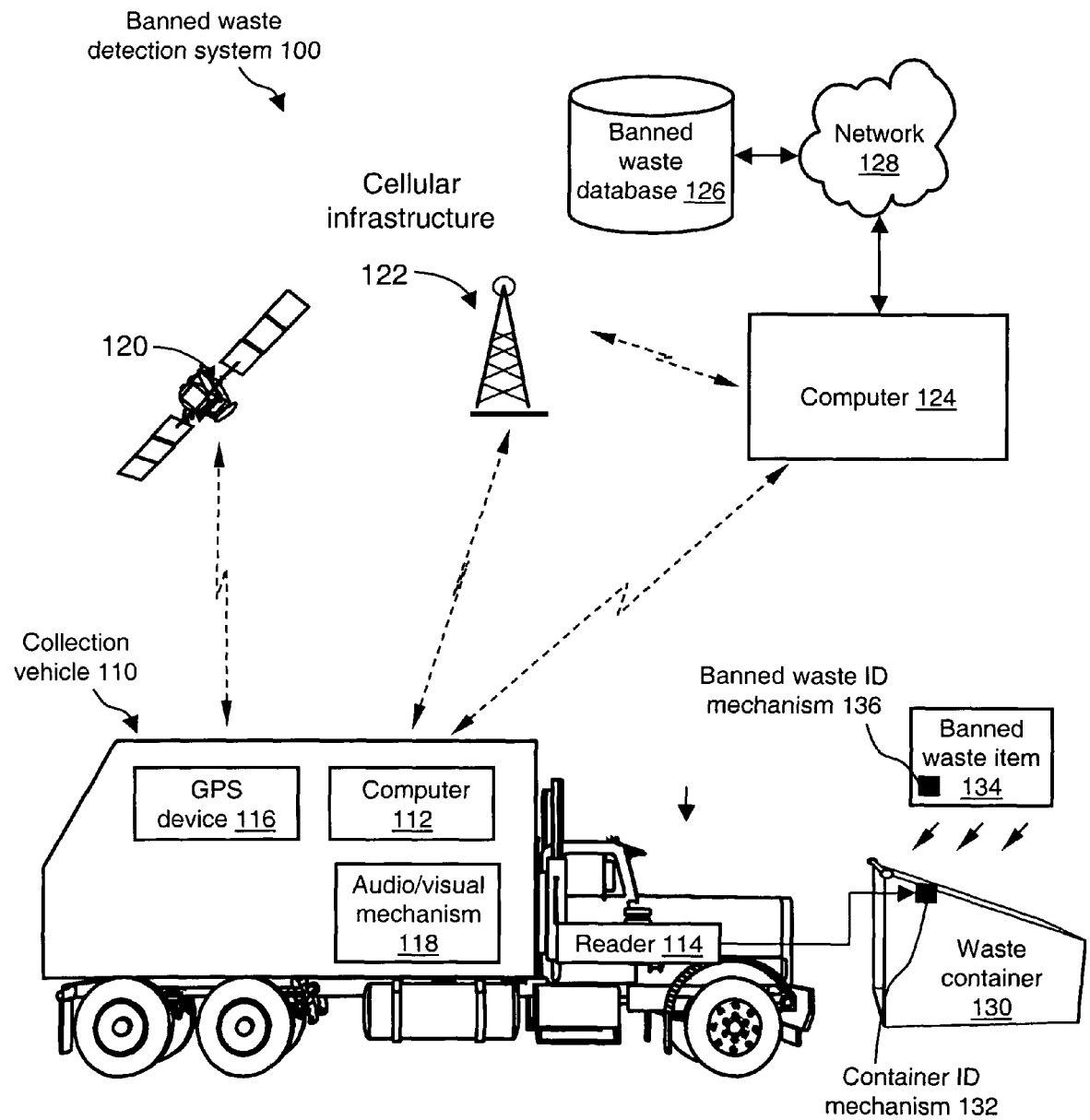
FIG. 1 is an exemplary block diagram of a banned waste detection system in accordance with an embodiment of the present invention.

FIG. 1 is an exemplary block diagram of a banned waste detection system 100 in accordance with an embodiment of the present invention. Banned waste detection system 100 includes a collection vehicle 110 that further includes computer 112, reader 114, global positioning system (GPS) device 116, and audio/visual mechanism 118.

Banned waste detection system 100 also includes GPS satellites 120, cellular infrastructure 122, computer 124, banned waste database 126, and network 128. Computer 124 and database 126 are connected via network 128. Additionally, banned waste detection system 100 includes waste container 130 that has a container identification (ID) mechanism 132 affixed thereon.

Collection vehicle 110 can be, for example, one or more conventional waste hauling trucks that are used to collect refuse from a plurality of originator points. Originator points are, for example, commercial and industrial sites, residential curbsides, and/or community drop-off points.

Computer 112 can be a standard laptop or desktop computer. Alternatively, computer 112 can be a mobile computing device that is integrated with collection vehicle 110. Such an integral computer 112 is supplied by Glacier Computing (New Milford, Conn.) or by Mobile Computing Corp. Inc. (Mississauga, Ontario). Computer 112 includes industry standard components (not shown) such as a standard user interface and display, a processor, and a storage device. Storage device can be a hard disk drive or other suitable non-volatile storage. Computer 112 also includes a clock device for providing timestamp data, and various standard interfaces such as universal serial bus (USB) for connecting to external devices. These devices are, for example, reader 114, GPS device 116, and audio/visual mechanism 118. Wireless communication is provided using, for example, a standard modem and cellular infrastructure 122, and/or an IEEE 802.11 wireless link. The wireless communication link allows computer 112 to communicate with computer 124 in various ways.

Reader 114 is a commercially available RFID tag reader system, such as the TI RFID system, manufactured by Texas Instruments Incorporated (Dallas, Tex.). GPS device 116 is a standard global positioning system that supplies position data, such as digital latitude and longitude. The GEOTAB GPS system is a commercially available vehicle fleet and productivity management system, manufactured by GEOTAB (Burlington, Ontario, Canada), that can be utilized.

Audio/visual mechanism 118 may be, for example, a buzzer, beeper, tone, and/or flashing light emitting diode (LED), that notifies collection vehicle 110 pickup personnel that reader 114 has detected banned waste item 134 via banned waste ID mechanism 136. Audio/visual mechanism 118 can be implemented on computer 112 using its visual display and/or the audio capabilities. GPS satellites 120 provide location data to GPS device 116 in a conventional manner. Cellular infrastructure 122 includes a plurality of cell towers and other cellular network interconnections (not shown), as is well known. Computer 124 can be, for example, any standard laptop or desktop computer, as is described in connection with FIG. 2.

Banned waste database 126 is a standard database, which is a collection of data related to identifying types of materials, also containing general guidelines concerning the handling thereof. An example of such a database is the CHEMLIST® database, available from CAS Databases (Columbus, Ohio).

Waste container 130 can be any commonly used, large-volume receptacle, such as a dumpster, a roll-off container, or a 90-gallon toter that is used for residential curbside collection. Container ID mechanism 132 can be, for example, an RFID tag or bar code that allows waste container 130 to be uniquely identified. Container ID mechanism 132 can be scanned by reader 114, in order to extract the identification number thereon. When container ID mechanism 132 is read by reader 114, the RFID data can be transmitted to computer 112, and subsequently transmitted to computer 124. The reading of container ID mechanism 132 allows customer database 218 (FIG. 2) to determine the customer (or owner) associated with the banned waste item 134 and/or record the time that the banned waste item 134 was detected.

Banned waste item 134 is a waste item that a waste management company is typically prohibited from collecting, or that may require special handling procedures. For example, banned waste 134 could be either hazardous and/or special waste that must be disposed of properly in order to comply with local, state, and federal laws and/or regulations. Banned waste ID mechanism 136 is, for example, a RFID tag, or other identifier such as a barcode, that provides identification data electronically to reader 114. Banned waste ID mechanism 136 may contain Resource Conservation and Recovery Act (RCRA) data that allows reader 114 to detect and determine that banned waste item 134 is hazardous. The RCRA data includes procedures that are to be used in treating, transporting, storing, and disposing of hazardous wastes. This information can be displayed by or in connection with computer 112.

By use of banned waste ID mechanism 136, banned waste item 134 can be identified and separated, so as not to co-mingle with the MSW stream. If banned waste 134 is detected, there several different courses of actions that might be taken. For instance, if the banned waste 134 can be visually identified and removed, the customer may be notified. In addition, waste container 130 may be quarantined and an inspector may be summoned to inspect the waste container 130. The banned waste may also, if appropriate, be collected by collection vehicle 110.

Figure 2:
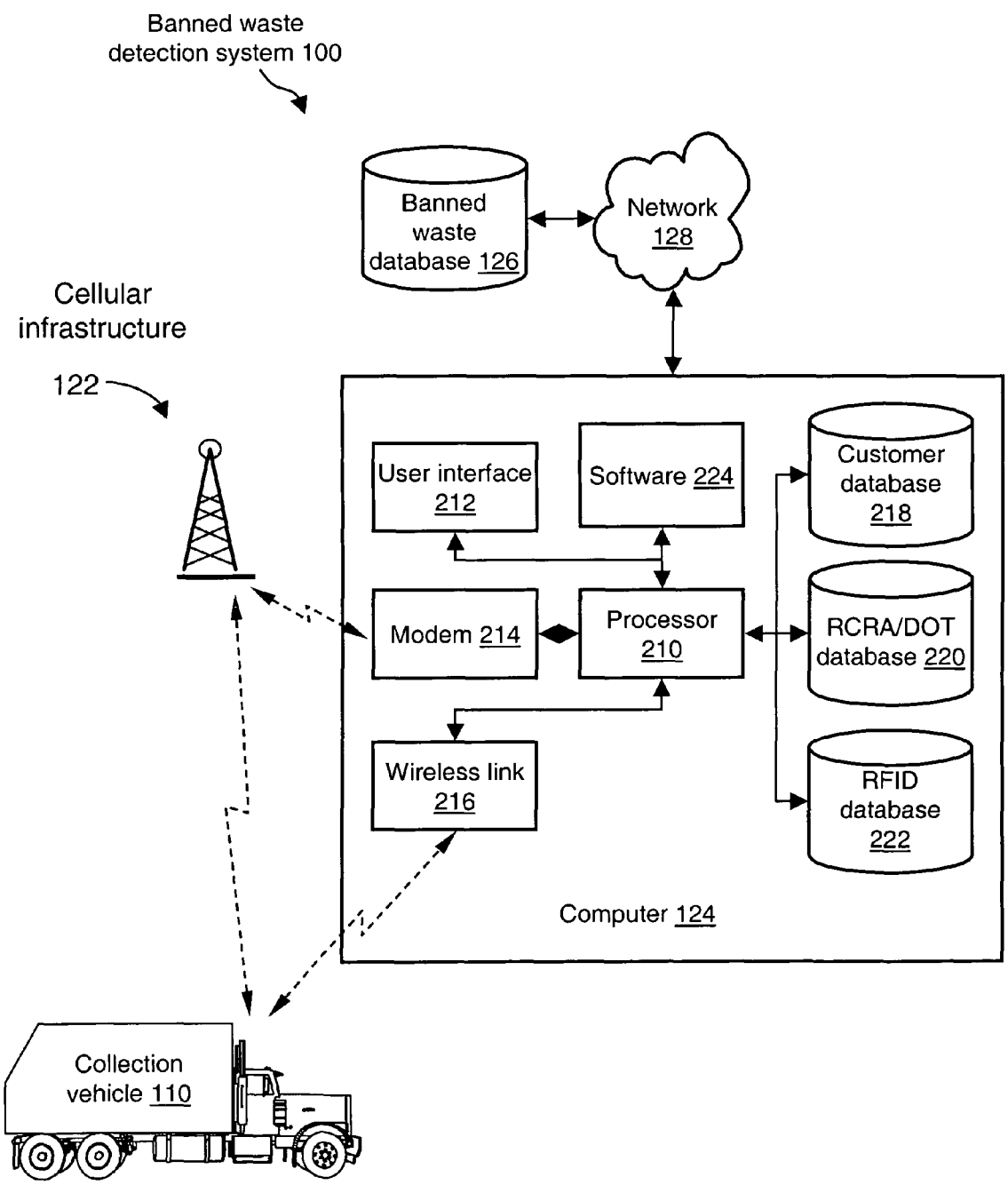
FIG. 2 is an alternate exemplary block diagram of a banned waste detection system in accordance with an embodiment of the present invention.

FIG. 2 is an exemplary block diagram of a banned waste detection system 100, in accordance with an embodiment of the present invention. Computer 124 includes standard components such as processor 210, user interface 212, modem 214, and wireless link 216. Computer 124 also contains, or utilizes one or more databases such as customer database 218, a Resource Conservation and Recovery Act/Department of Transportation (RCRA/DOT) database 220, and RFID database 222.

Processor 210 can be a standard general purpose microprocessor, such as a Pentium or a PowerPC microprocessor device. User interface 212 can be a standard computer user interface for inputting and displaying data, such as a keyboard, mouse, or touch screen with accompanying menus and prompts. Modem 214 can be a standard wireless modem manufactured, for example, by CYNET Incorporated (Houston, Tex.). Wireless link 216 can be a standard interface that communicates using one or more wireless data communications links. Long range data links such as a Code Division Multiple Access (CDMA) 1×EV-DO or General Packet Radio Service (GPRS) link may be used. Short range wireless links such as IEEE 802.11 may also be used.

Customer database 218, RCRA/DOT database 220, and RFID database 222 are standard data repositories, or databases. The information stored in these repositories can be stored on a single medium and/or have their contents combined. Repositories 218, 220, 222 can be implemented in any manner that facilitates storage, access to, and/or retrieval of data. More particularly, customer database 218 may contain, for example, data fields and associated data pertaining to customer name, billing address, service address, frequency of service, account/payment/billing status, and service address GPS coordinates.

RCRA/DOT database 220 contains a collection of data and information associated with the identification, collection, and management of hazardous and/or special waste, according to RCRA/DOT requirements, which may include federal, state, and/or local regulatory information that pertains to banned waste. For example, RCRA/DOT database 220 includes the following information: i) a solid waste that exhibits that characteristic of ignitability has the EPA Hazardous Waste Number of D001; ii) a solid waste that exhibits the characteristic of corrosivity has the EPA Hazardous Waste Number of D002; iii) a solid waste that exhibits the characteristic of reactivity has the EPA Hazardous Waste Number of D003; iv) a solid waste exhibits the characteristic of toxicity can have an EPA Hazardous Waste Number of D004 through D043. In addition to the D series above, the EPA also has an "F" Series, a "K" series, a "P" and a "U" series, as previously noted. RCRA/DOT database 220 also includes data such as safe and secure procedures that are to be used in treating, transporting, storing, and disposing of hazardous wastes.

RFID database 222 contains a record of items that may include banned waste items. For example, RFID database 222 contains a record of the specific RFID data associated with glass containers, plastic containers, aluminum containers, paper products, as well as banned waste items 134. As reader 114 scans mechanisms 136, computer 112 may keep a rolling tally (e.g., an inventory) of items 134 that are collected by vehicle 110.

Customer database 218, RCRA/DOT database 220, and RFID database 222 can reside in a memory device (not shown), such as a hard disk drive of computer 124. In one or more alternate embodiments of the present invention, one or more of repositories 218, 220, 222 may also reside on collection vehicle 110, on a storage medium (not shown) used in connection with computer 112. The contents of customer database 218, RCRA/DOT database 220, and RFID database 222 may be organized and combined in any user-defined relational or non-relational database structure.

Software 224 analyzes data that is received from reader 114. For example, software 224 cross-references, as appropriate, the ID data received from mechanisms 132 and 136, via collection vehicle 110, to customer database 218, RCRA/DOT database 220 and/or RFID database 222. In doing so, software 224 determines the customer from mechanism 132 using customer database 218, and the type of each waste item 134 from mechanism 136 using RCRA/DOT database 220 and/or RFID database 222. Software 224 can identify any banned waste 134 that has been co-mingled in waste container 130.

Figure 3:
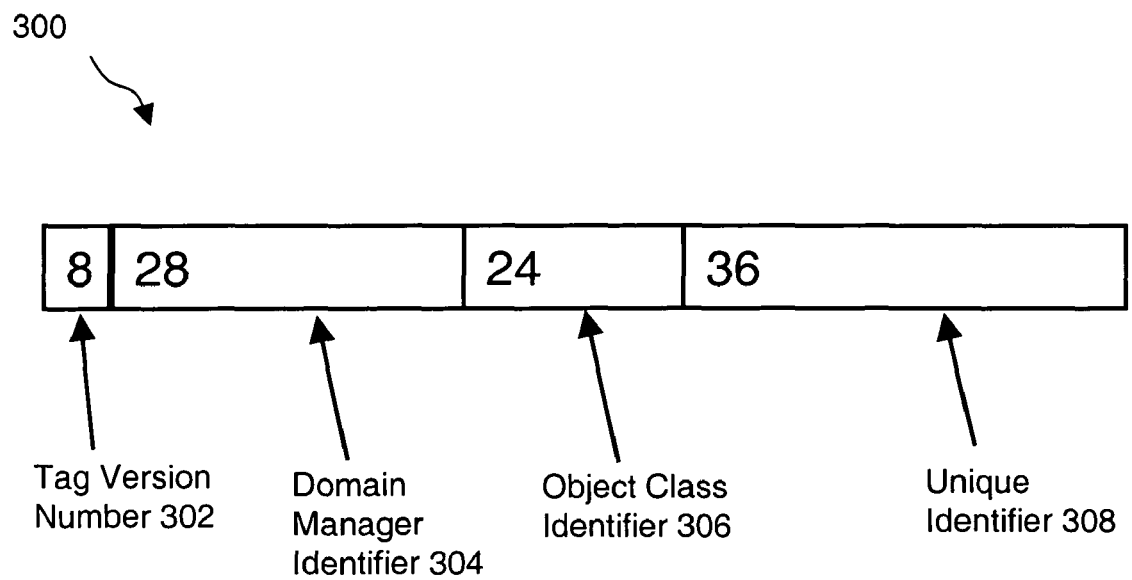
FIG. 3 is a 96-bit EPC™ structure that can be used in conjunction with one or more embodiments of the present invention.

In operation, collection vehicle 110 arrives at a pick-up location and engages waste container 130 and reads container ID mechanism 132. When mechanism 132 is a RFID tag, the format of mechanism may correspond to that shown in FIG. 3. In particular, FIG. 3 illustrates the Electronic Product Code (EPC), which is a standard format for storing identification information in RFID tags. The EPC is designed to replace the Universal Product Code (UPC) currently utilized in conjunction with barcodes. An EPC-96 code has four components:

(a) an 8-bit tag version number 302, indicating the tag type (e.g., 96-bit EPC Class 1);
(b) a 28-bit domain manager identifier 304, such as a number specifying the entity that administers the tag code (e.g., "ABC Co.");
(c) a 24-bit object class identifier 306, such as a number specifying the type of product the RFID tag is attached to (e.g., "16 oz. Coca-Cola bottle"); and
(d) a 36-bit unique identifier 308, which is a number that, in combination with the other EPC components, uniquely identifies the tag (and object).

Figure 4:
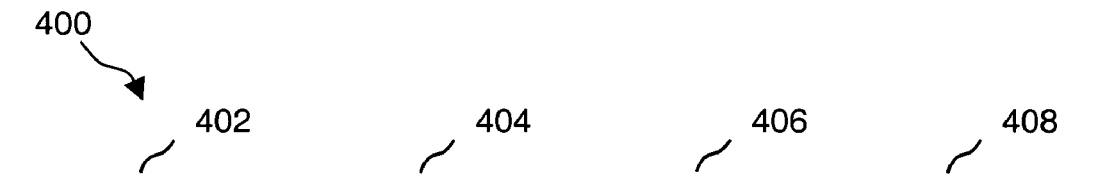
FIG. 4 is an exemplary data table in accordance with an embodiment of the present invention.

If RFID tags 134 utilize the EPC as illustrated in FIG. 3, repositories 220, 222 can be implemented accordingly. For example, FIG. 4 is an exemplary data table 400 representing at least a portion of database 220, that may be utilized in connection with system 100. Column 402 shows the unique identifier 308 that is read by reader 114. This number is used as an index into table 400, at 402, to find the correct row containing information about a waste item with the read identification code (only 4 bits of the 36-bit unique identifier 308 are shown in column 402). Column 404 contains information stating whether banned waste item 134 is safe to handle by a driver of collection vehicle 110. Column 406 contains any special handling instructions for banned waste item 134. Finally, column 408 contains the EPA code associated with the banned waste item 134, which provides additional information about the waste item 134. As shown in column 408, information can include the EPA class, as described above.

FIG. 5 is an exemplary data table 500 representing at least a portion of RFID database 222, that may be utilized in connection with system 100. Entries can be indexed by the 36-bit unique identifier 308 (only 5 bits of the 36-bit unique identifier 308 are shown in FIG. 5). RFID database 222 may also include the 28-bit domain manager identifier 304 and the 24-bit object class identifier 306. Entries in table 500 can also include weight 506 and type of material 508 associated, for example, with recyclable item in container 130. Therefore, in this example, after receiving an EPC-96 code containing unique identifier 308, domain manager identifier 304 representing Company B and object class identifier (306) 1, software 224 can cross reference the table in FIG. 5 and determine that the corresponding item is a 12 ounce aluminum can weighing 5 grams. In one or more other embodiments of the present invention, column 308 of FIG. 5 may contain an EPA class identifier, as described above. For example, if it is determined that 4 bits of the 36 bit unique identifier 308 is reserved for EPA class identification, reader 112 may read these bits. In this instance, either computer 112 or computer 124 would determine that the item 134 is a banned waste item 134.

An occupant of vehicle 118 (e.g., the driver) will use reader 114 to scan the contents of waste container 130 before it is emptied onto collection vehicle 110. In the case in which waste container 130 contains at least one banned waste item 134, captured ID data is transmitted from computer 112 to computer 124 via, for example, wireless link 216.

Computer 112 receives the data from mechanisms 132, 136, via reader 114, and transmits the data via wireless link 216 to computer 124. At computer 124, databases 218, 220, 222 are accessed. Software 224 cross-references the ID data received from mechanism 132 to customer database 218, RCRA/DOT database 220, and/or RFID database 222. If necessary, software 224, via network 128, queries banned material database 126 for banned materials information if there is insufficient information in RCRA/DOT database 220 to identify the material. In doing so, software 224 determines the type of waste items 134 and identifies any banned waste items 134 that have been co-mingled in the MSW stream.

For example, after reading mechanism 136, software 224 queries RCRA/DOT database 220 to identify a banned waste item 134. Software 224 determines, for example, from RCRA/DOT database 220 that one banned waste item 134 is material coded D003 by the EPA. This code indicates that the material possesses the characteristic of reactivity, and is in fact a hazardous material, and that banned waste item 134 is unstable, reacts violently, explodes or produces toxic vapors under certain conditions. Since software 224 determines that at least one banned waste item 134 is present within the given waste container 130, the driver of vehicle 110 is alerted that a banned waste item 134 has been detected by computer 112 via computer 124 and/or by audio/visual mechanism 118. Computer 112 and/or audio/visual mechanism 118 alert the driver, for example, as to whether banned waste item 134 is safe to remove from waste container 130. If banned waste item 134 is unsafe to remove, the waste management company notifies the customer, using information from customer database 218, that a banned waste item 134 has been detected at his/her pickup location and, therefore, the waste management company is unable to complete the pickup.

Implementation of database 124 is not limited to the example illustrated in FIGS. 2A and 2B; various implementations of repository 124 can be used to achieve the same results. The implementation of repository 124 may also vary depending on the type of identification information contained in RFID tags 134.

Figure 6:
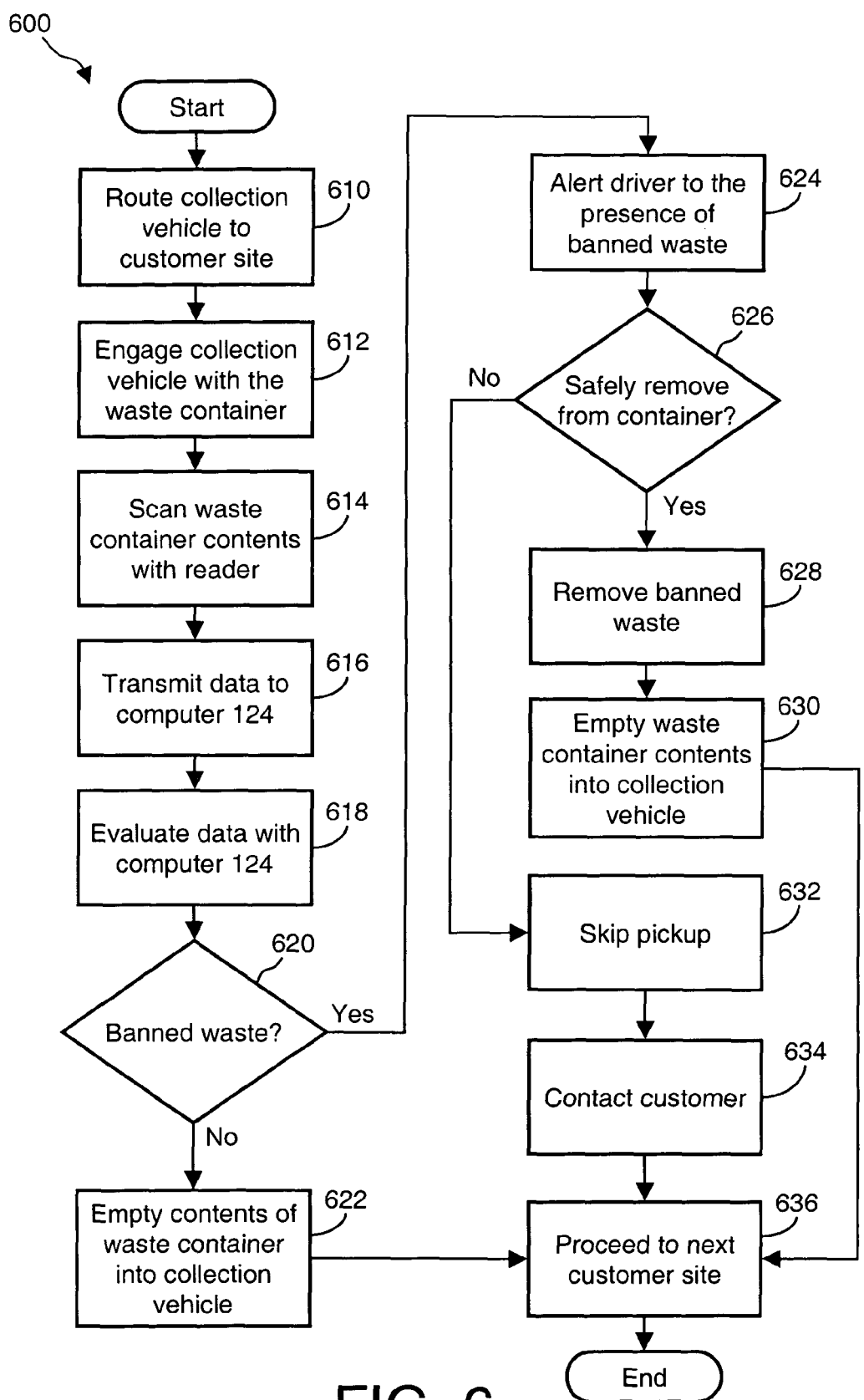
FIG. 6 is an exemplary method in accordance with an embodiment of the present invention that is used to detect banned waste.

FIG. 6 is a flow diagram for detecting banned waste by use of the banned waste detection system 100 of an embodiment of the present invention. At step 610, collection vehicle 110 arrives at a given customer to service one or more waste containers 130. GPS device 116 in combination with GPS satellites 120 can be used to confirm whether collection vehicle 110 is at a location that should be provided service. For example, at a given pickup site (customer), collection vehicle 110 may receive GPS coordinates via GPS satellites 120, and transmit those coordinates to computer 124. Computer 124 may have a database 128 that correlates active customers in good standing with their respective GPS coordinates. If computer 124 determines that GPS coordinates transmitted by collection vehicle do not pertain to an existing customer, or that an existing customer is not in "good status" and thus should not be provided service, computer 124 can transmit an indication to collection vehicle 110 that the location that collection vehicle 110 is presently at should not be serviced.

At step 612, collection vehicle 110 engages physically with waste container 130, by means of a lifter mechanism (not shown), according to standard practice, which causes reader 114 to be in close physical proximity to container ID mechanism 132.

At step 614, reader 114 scans container ID mechanism 132, and thereby reads the ID of waste container 130. Reader 114, also scans the contents of waste container 130 before it is emptied into collection vehicle 110. Mechanism 136 may contain RCRA/DOT information that allows computer 112 to detect that the waste item is, in fact, banned waste. This is accomplished by placing reader 114 in proximity to the contents of waste container 130, allowing reader to read the identification data stored on any banned waste ID mechanism 136 attached to any item within waste container 130. The ID data of container ID mechanism 132 and banned waste ID mechanism 136 is transmitted from reader 114 to computer 112 at step 616.

At step 618, software 224 analyzes the RFID data that is received from reader 114. For example, software 224 cross-references, as appropriate, the ID data received from collection vehicle 110 to customer database 218, RCRA/DOT database 220, and/or RFID database 222. If necessary, software 224 queries banned material database 126 for banned materials information if there is insufficient information in RCRA/DOT database 220. In doing so, software 224 determines the type of each waste item in waste container 130 and identifies any banned waste item(s) 134 in waste container 130.

At decision step 620, if software 224 determines that at least one banned waste item 134 is present within the given waste container 130, the driver of collection vehicle 110 is alerted that banned waste item(s) 134 has been detected by computer 112 via computer 124 and/or by audio/visual mechanism 118 at step 624.

If, at decision step 620, software 224 determines that no banned waste items 134 are present within the given waste container 130, the contents of waste container 130 can be emptied into collection vehicle 110 at step 622. At step 636, collection vehicle 110 can proceed to the next customer site.

At decision step 626, computer 112 determines whether banned waste item 134 is safe to remove from waste container 130. If it is determined that the banned waste item 134 is safe to remove then, at step 628, the banned item 134 may be removed. For example, if banned waste item 134 is a can of oil based paint (which is safe to remove), the can may be removed at step 628. Optionally, if at step 628 banned waste is safely removed from waste container 130, then customer can also be notified of this fact. At step 630, waste container 130 is emptied into collection vehicle 110 and, at step 636, collection vehicle 110 proceeds to the next customer site.

If it is determined at decision step 626 that banned waste item 134 cannot be safely removed from waste container 130 then, at step 632, the driver of collection vehicle 110 skips the pickup. At step 634, the waste management company notifies the customer that a banned waste item 134 has been detected at its pickup location and, therefore, the waste management company is unable to complete the pickup. At step 636, collection vehicle 110 proceeds to the next customer site.

In an alternate embodiment, method 600 can be performed with computer 112 only. In this embodiment, identification data read by reader 114 is processed by computer 112 instead of being transmitted to computer 124. Computer 112 can contain the contents of databases 218, 220, and 222 on a local storage medium. If one or more of databases 218, 220, 222 are stored on computer 112, they can be updated by well known methods, such as wireless updates, updates when wired to a network, or updates provided on removable media.

Figure 7:
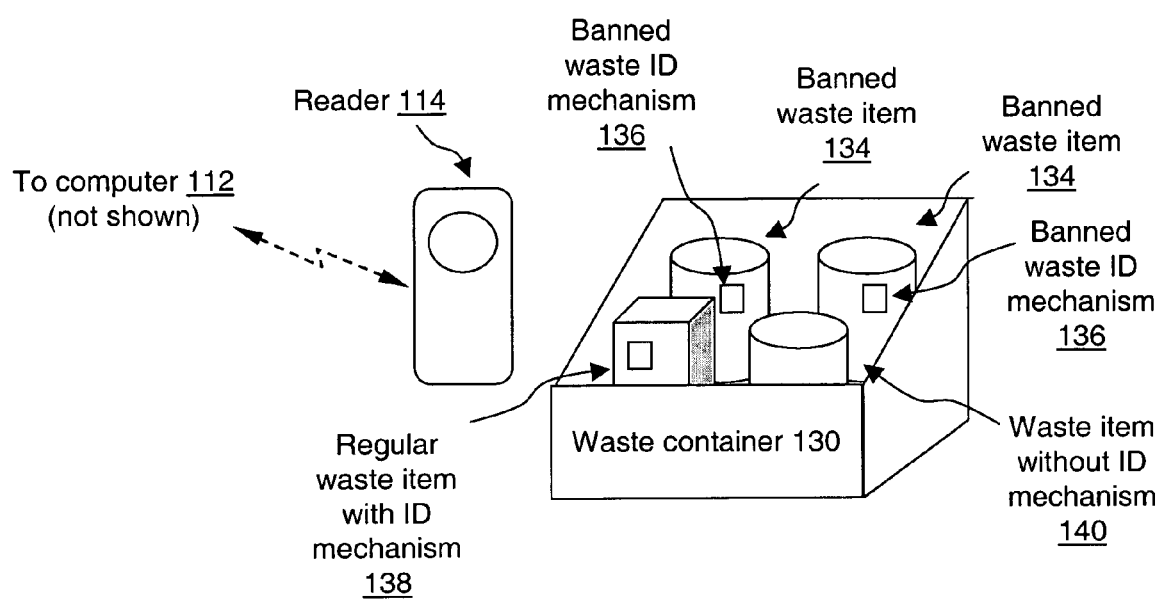
FIG. 7 is an exemplary arrangement of items in a waste container.

FIG. 7 is an exemplary an exemplary arrangement of banned waste items 134 in waste container 130. Reader 114 can be connected wirelessly or via a wired connection to computer 112.

Waste ID mechanism 136 is scanned when reader 114 is placed sufficiently close to banned waste item 134 such that reader 114 is able to receive the appropriate radio frequency signals from banned waste ID mechanism 136. Reader can read multiple banned waste ID mechanisms contained within waste container 130 if reader is also sufficiently close to the other banned waste ID mechanisms. Waste container 130 can also contain other waste items 138 that are either not affixed with a RFID mechanism, or waste items 140 that have RFID mechanisms, but are not banned waste items.

We claim:

1. A computer implemented method of identifying banned waste items, comprising:
    providing a waste collection vehicle comprising an electronic reading device in close proximity to a waste container;
    utilizing the reading device to read a plurality of identifiers affixed to a respective plurality of items in a waste container;
    said computer receiving the data and comparing the data read to banned waste reference data; and
    providing an indication when the data read matches at least a portion of the banned waste reference data.

2. The method of claim 1, wherein the identifiers comprise radio frequency identification tags.

3. The method of claim 2, further comprising sending a non-compliance notification to a customer.

4. The method of claim 3, wherein sending the notification to a customer comprises:
    retrieving, from a data repository of customer information, information pertaining to the customer; and
    using the information to notify the customer.

5. The method of claim 4, wherein the information comprises a current customer address.

6. The method of claim 1, wherein a computer associated with the computer is utilized to compare the data read to the banned waste reference data.

7. The method of claim 6, further comprising the computer providing at least one of visual and audible handling instructions for at least one of the banned waste items.

8. The method of claim 1, wherein a computer remote from the waste collection vehicle is utilized to compare the data read to the banned waste reference data.

9. The method of claim 8, wherein a computer associated with the waste collection vehicle provides at least one of visual and audible handling instructions for at least one of the banned waste items.

10. The method of claim 1, wherein the comparing step comprises:
    transmitting the data read from the plurality of identifiers to a computer associated with the waste collection vehicle;
    comparing, using the computer, the data read from the plurality of identifiers to the reference data; and
    providing at least one of a visual and audible response when the comparison indicates the presence of a banned waste item.

11. A system for identifying banned waste items in a waste management environment, comprising:
    a plurality of identifiers affixed to a respective plurality of items in a waste container; and
    a vehicle comprising:
        a reader for reading data from the plurality of identifiers;
        a data repository comprising reference data;
        a computer for comparing the read data to the reference data; and
        a device for providing at least one of a visual and an audible indication when at least a portion of the read data matches at least a portion of the reference data.

12. The system of claim 11, wherein the read data is transmitted to the computer.

13. The system of claim 11, wherein the read data is transmitted wirelessly from the reader to the computer.

14. The system of claim 11, wherein the plurality of identifiers comprise radio frequency identification tags.

15. The system of claim 11, wherein the computer provides handling instructions for those read items having at the read data matching at least a portion of the reference data.

16. A system for identifying banned waste items in a waste management environment, comprising:
    a plurality of identifiers affixed to a respective plurality of items in a waste container; and
    a vehicle comprising:
        a reader for reading data from the plurality of identifiers;
        a transceiver that receives the read data and transmits the read data for use in connection with a data repository comprising reference data, and receives an indication when a portion of the read data matches at least a portion of the reference data; and
        a device for providing at least one of a visual and an audible indication when at least a portion of the read data matches at least a portion of the reference data.

17. The system of claim 16, wherein the plurality of identifiers comprise radio frequency identification tags.

18. The system of claim 16, wherein the vehicle further comprises a computer that provides handling instructions for those read items having at the read data matching at least a portion of the reference data.

19. The system of claim 18, wherein the read data is transmitted wirelessly from the reader to the computer.

* * * * *